R. RILEY.
DIRT SCRAPER.
APPLICATION FILED SEPT. 12, 1919.
1,358,017.
Patented Nov. 9, 1920.
2 SHEETS—SHEET 1.
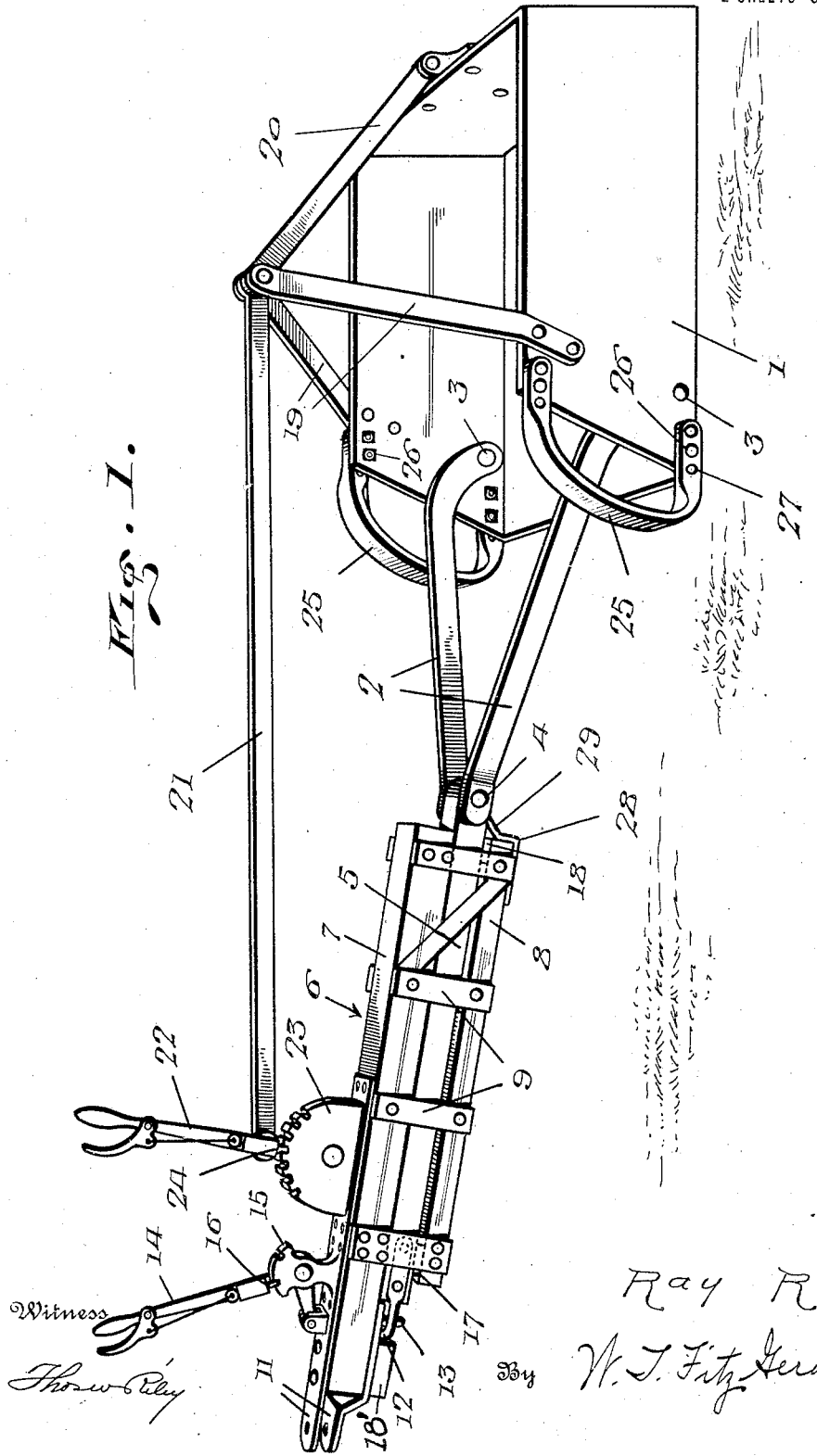
Inventor
Ray Riley
By W. J. Fitz Gerald Co.
Attorney
Witness
Thos. W. Riley

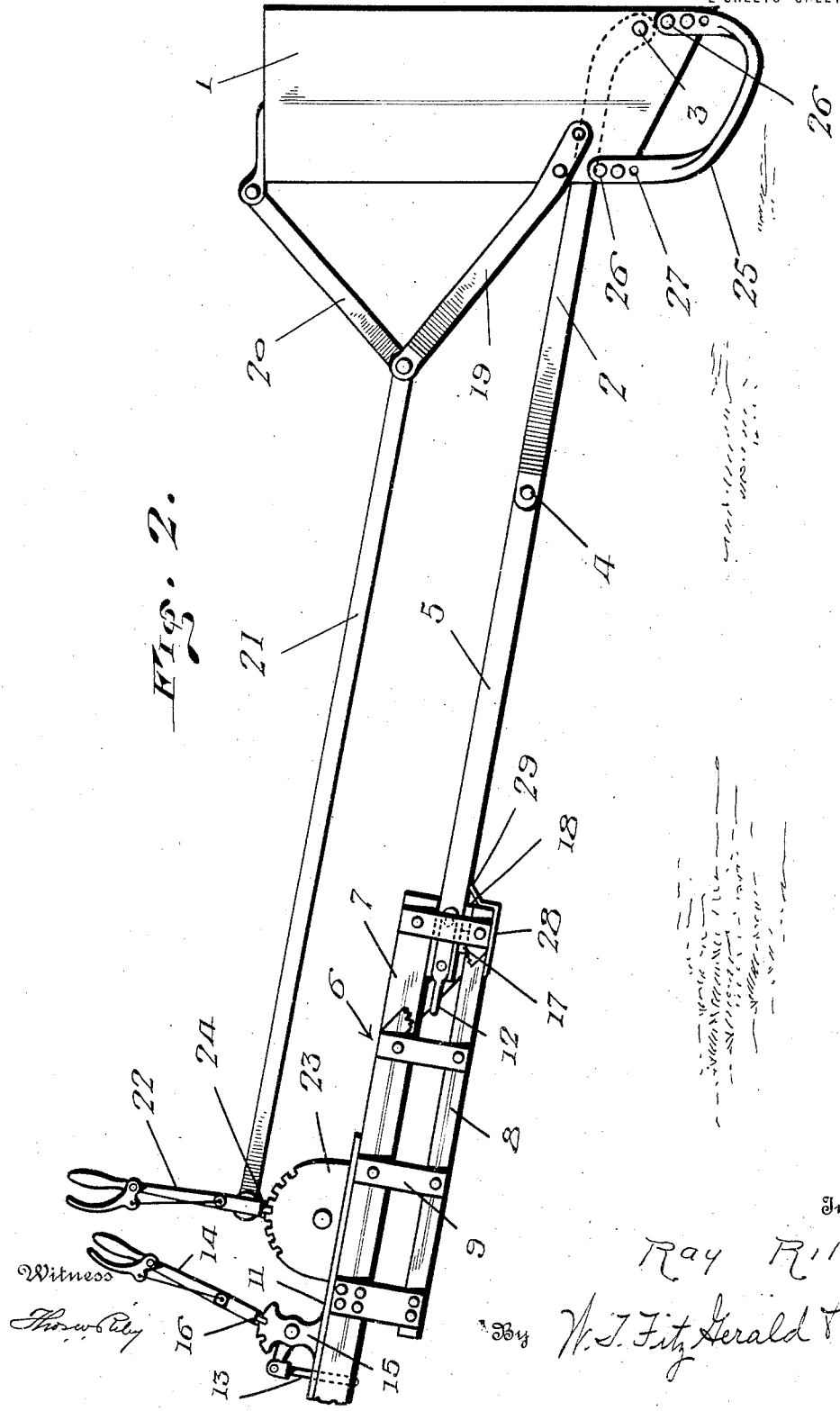

ABANDON # UNITED STATES PATENT OFFICE.

RAY RILEY, OF CASTLEWOOD, SOUTH DAKOTA.

DIRT-SCRAPER.

1,358,017.

Specification of Letters Patent.

Patented Nov. 9, 1920.

Application filed September 12, 1919. Serial No. 323,308.

*To all whom it may concern:*

Be it known that I, RAY RILEY, a citizen of the United States, residing at Castlewood, in the county of Hamlin and State of South Dakota, have invented certain new and useful Improvements in Dirt-Scrapers; and I do hereby declare the following to be a full, clear, and exact description of the invention, such as will enable others skilled in the art to which it appertains to make and use the same.

This invention relates to a scraper or scoop for removing dirt, sand, and the like, from one point and conveying it to another point at which it is discharged, and the invention aims to provide a novel and improved device of comparatively simple and inexpensive construction for conveniently and efficiently scooping up the dirt and dumping same at the desired point.

Another object is the provision of such an appliance having means for adjustably holding the scoop in different angular positions as it is drawn forward, so that it will scoop up or scrape the dirt effectively.

A further object is the provision of means enabling the scoop to be released for automatic dumping, and means whereby such release of the scoop results in the same being tilted or its rear end raised to dump the material therefrom.

A still further object is to provide a scoop having runners or other supporting members at its forward end, and means connected to the scoop for pulling it forward at any desired angle and operable for releasing the forward end of the scoop so that the rear end is pulled upwardly, thereby supporting the scoop on the runners or supporting members for the discharge of dirt therefrom and to raise the forward end of the scoop to pass over the dirt.

With the foregoing and other objects in view, which will be apparent as the description proceeds, the invention resides in the construction and arrangement of parts hereinafter described and claimed, it being understood that changes can be made within the scope of what is claimed without departing from the spirit of the invention.

The invention is illustrated in the accompanying drawings, wherein:—

Figure 1 is a perspective view of the mechanism with the scoop in position to scrape up and gather the dirt therein.

Fig. 2 is a side elevation showing the scoop in dumping position.

Any suitable scoop 1 can be used, and it is pulled forwardly by draft bars 2 pivoted at their rear ends, as at 3, to the sides of the scoop near the forward end thereof, and converging forwardly. The forward ends of the bars 2 are riveted, as at 4, to the rear end of a slide bar 5; said bar 5 is slidable longitudinally in a longitudinal frame 6 comprising upper and lower parallel bars 7 and 8, connected by vertical pieces or plates 9, and straps 11 are secured to the upper bar 7 and extend beyond the forward end thereof, for the connection of the cable or rope that is used for pulling the scoop, such as by the use of a winch or the like. A bar 5 is held in forward position in the frame 6 by means of a keeper 12 secured to the forward end of the bar, for the reception of a vertical latch pin 13 slidable through the bar 7 and this pin 13 is connected to the lower short arm of a hand lever 14 fulcrumed on a segment 15 mounted on the bar 7. This lever 14 has a pawl or dog 16 to engage the segment for holding said lever in either of its extreme positions. Ordinarily when the scoop is scraping up the dirt, the latch pin 13 is moved downwardly to pass through the keeper or loop 12, and thus latch the bar 5 and frame 6 together. When the pin 13 is raised by swinging the lever 14, this releases the bar 5 so that said bar and frame can separate. The movement apart of the bar 5 and frame 6 is limited, such as by a lug 17 on the bar 5 near its forward end contacting with a stop 18 of the frame 6 near the rear end thereof.

As a means for tilting the scoop to different angular positions, and for pulling the rear end thereof upwardly when the scoop is to be dumped, bars 19 are secured to the sides of the scoop, and a bar 20 to the rear end of the scoop, and said bars 19 and 20 converge upwardly and are secured by a common rivet to the rear end of a bar or link 21, providing a pivotal connection of said bars. The forward end of the bar 21 is pivotally connected with a second hand lever 22 fulcrumed on a segment 23 carried by the frame 6, and said lever has a pawl or dog 24 engageable with said segment. The lever 22 is used for moving the bar 21 forwardly and rearwardly relatively to the frame 6, which will change the angular position of the scoop.

Curved runners or shoes 25 have their end portions attached to the forward ends of the sides of the scoop, by bolts 26 or the like, and said end portions of the runners have apertures 27 for the adjustment of the runners. These runners are for the purpose of supporting the scoop with its forward edge off of the ground, when the scoop is tilted forwardly for dumping. The adjustment of the runners regulates the height that the scoop is raised above the ground, so as to spread the dirt to the corresponding depth when dumping.

A plate 28 is preferably secured to the rear end of the bar 8 and is bent upwardly in rear of said bar to provide a scraper 29 engaging the lower side of the bar 5, to scrape any dirt therefrom when said bar 5 is moved forwardly into the frame 6. Thus, any dirt which may cling to said bar 5 when it is pulled from the frame, will be removed therefrom.

In operation, when the scoop is to be pulled for gathering up the dirt, the bar 5 and frame 6 are slid together, and the latch pin 13 moved downwardly through the keeper or loop 12, and the hand lever 22 is adjusted so as to bring the scoop to the desired angular position with respect to the line of movement. Thus, by moving the hand lever forward, this will raise the rear end of the scoop, so that the forward end will have a greater tendency to dig down into the dirt, and the opposite effect can be had by adjusting the hand lever 22 rearwardly. This provides for the adjustment of the scoop so that it will scoop up the dirt effectively. The scoop will then scrape up and collect the dirt therein. There is no liability of the scoop dumping prematurely, because the bar 21 holds the scoop in position while being pulled forwardly, even though the scoop may be at a considerable pitch or inclination. When the scoop has been drawn to the point for dumping, the operator can conveniently swing the lever 14 for withdrawing the latch pin 13 from the keeper 12 whereby the frame 6 will move forwardly, leaving the bar 5 stand still until the stop 18 contacts with the lug 17, as seen in Fig. 2. During such forward movement of the frame 6 relatively to the bar 5 the bar 21 will pull the bars 19 and 20 forwardly, thereby raising the rear end of the scoop and bringing the scoop in an upright or tilted position on the runners or supporting members 25. The contents of the scoop will therefore drop therefrom, and the forward edge of the scoop is raised above the ground so as to pass over the dirt. The dumping is therefore automatic when the latch pin 13 is raised to release the bar 5, causing the scoop to be rolled upwardly and forwardly on the runners 25. This operation of the lever 14 can be attended to by the driver of the tractor or engine used for operating the scoop and relieves the operator of the labor of turning the scoop over. By backing up the frame 6, it will move over the bar 5, and the bar 21 moving rearwardly will swing the scoop backwardly and downwardly. The latch pin 13 can then be reëngaged with the keeper 12, so that the scoop can be returned for another operation. The present device saves labor, both in scooping up the dirt, and in dumping the scoop, it being noted that the pitch or inclination of the scoop will regulate the scooping up of the dirt, while the releasing of the bar 5 will result in the automatic dumping of the dirt. Furthermore, there is no liability for the scoop dumping prematurely before the bar 5 is released.

Having thus described the invention, what is claimed as new is:—

1. A dirt scraper comprising an unsupported scoop to drag on the ground, a pulling frame, a bar slidable longitudinally in said frame, and connected to the scoop for pulling it, means for latching said bar and frame together when slid together so as to pull the scoop with said frame, and means connected to said frame and scoop and operable for pulling the rear portion of the scoop upwardly and turning the scoop onto its forward end when said bar and frame are released from one another, the scoop having means independent of the foregoing for supporting the forward end thereof off of the ground when the rear end is swung upwardly.

2. A dirt scraper comprising an unsupported scoop to drag on the ground, a pulling frame, a bar slidable in said frame and connected to the scoop for pulling same forwardly, means for latching said frame and bar together when slid together to pull the scoop with the frame, and means connecting said frame and scoop and operable for swinging the rear portion of the scoop upwardly and turning the scoop onto its forward end when said frame and bar are released from one another, the last named means having an adjusting device for holding the scoop in different angular positions when said frame and bar are latched together.

3. A dirt scraper comprising an unsupported scoop to drag on the ground having portions extending upwardly, a pulling frame, means connecting said frame and portions to pull the scoop upwardly when released, means connected to the forward portion of the scoop and movable relatively to said frame, and means for latching the last named means and frame together for pulling the scoop with said frame.

4. A dirt scraper comprising an unsupported scoop to drag on the ground, a pulling frame, means connected to the scoop above the same for pulling the scoop upwardly, an adjustable connection between said means and frame for tilting the scoop to different angles, means connected to the forward portion of the scoop and slidable relatively to said frame, and means for latching the last named means and frame together for pulling the scoop with said frame.

5. A dirt scraper comprising an unsupported scoop to drag on the ground, a pulling frame, portions extending upwardly from the scoop, a bar connecting said portions and frame, a second bar slidable longitudinally in the frame and connected to the forward portion of the scoop, and means for latching the second named bar to the frame when they are slid together.

6. A dirt scraper comprising a scoop, a pulling frame, portions extending upwardly from said scoop, and an adjustable hand lever mounted on the frame, a bar connecting said lever and portions, a second bar slidable in the frame and connected to the forward portion of the scoop, and a latch for latching the second named bar to the frame when they are slid together.

In testimony whereof I have signed my name to this specification in the presence of two subscribing witnesses.

RAY RILEY.

Witnesses:
C. F. POULSON,
WILLIAM STRUBLE.